(12) United States Patent
Kim et al.

(10) Patent No.: US 10,476,096 B2
(45) Date of Patent: Nov. 12, 2019

(54) METHOD FOR MANUFACTURING SECONDARY BATTERY AND METHOD FOR MANUFACTURING ELECTRODE ASSEMBLY

(71) Applicant: LG CHEM, LTD., Seoul (KR)

(72) Inventors: Sung Jong Kim, Daejeon (KR); Tae Kyu Kim, Daejeon (KR); Kyung Taek Kim, Daejeon (KR); Dong Hyun Kim, Daejeon (KR); Kyung Jae Lee, Daejeon (KR); Cha Hun Ku, Daejeon (KR); Eui Kyung Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/754,335

(22) PCT Filed: Apr. 25, 2017

(86) PCT No.: PCT/KR2017/004381
§ 371 (c)(1),
(2) Date: Feb. 22, 2018

(87) PCT Pub. No.: WO2017/191922
PCT Pub. Date: Nov. 9, 2017

(65) Prior Publication Data
US 2019/0051924 A1    Feb. 14, 2019

(30) Foreign Application Priority Data

May 2, 2016    (KR) .................. 10-2016-0054112

(51) Int. Cl.
*H01M 10/04*    (2006.01)
*H01M 2/14*    (2006.01)
*H01M 2/16*    (2006.01)

(52) U.S. Cl.
CPC .......... *H01M 10/04* (2013.01); *H01M 2/145* (2013.01); *H01M 2/1673* (2013.01)

(58) Field of Classification Search
None
See application file for complete search history.

(56) References Cited

U.S. PATENT DOCUMENTS

| | | | |
|---|---|---|---|
| 2013/0089771 A1* | 4/2013 | Nishikawa | H01M 2/162 429/145 |
| 2015/0093567 A1 | 4/2015 | Jeon | |
| 2017/0066217 A9 | 3/2017 | Jeon | |

FOREIGN PATENT DOCUMENTS

| | | |
|---|---|---|
| JP | 2015-118816 A | 6/2015 |
| KR | 10-1154883 B1 | 6/2012 |

(Continued)

OTHER PUBLICATIONS

Choi et al. KR 20150028537 machine translation (Year: 2015).*

(Continued)

*Primary Examiner* — Wojciech Haske
(74) *Attorney, Agent, or Firm* — Mintz Levin Cohn Ferris Glovsky and Popeo, P.C.; Kongsik Kim; Jhongwoo Jay Peck (57) ABSTRACT

The present invention relates to a method for manufacturing a secondary battery. The method comprises: a first process (S10) of manufacturing an incomplete electrode assembly; a second process (S20) of partially pressing the incomplete electrode assembly to manufacture a complete electrode assembly in which a bonding portion and a nonbonding portion coexist; a third process (S30) of accommodating the complete electrode assembly into a case; a fourth process (S40) of injecting an electrolyte through an opening of the case to impregnate the electrolyte into the electrode assembly; a fifth process (S50) of sealing an unsealed surface in which the opening of the case is formed to manufacture a (Continued)

secondary battery; and a sixth process (S60) of heating and pressing an entire surface of the secondary battery to bond the nonbonding portion of the interface between the electrode and the separator.

13 Claims, 12 Drawing Sheets

(56) References Cited

FOREIGN PATENT DOCUMENTS

| KR | 10-2012-0095122 A | 8/2012 |
| KR | 10-2015-0028537 A | 3/2015 |
| KR | 10-2015-0037049 A | 4/2015 |
| KR | 10-2015-0119628 A | 10/2015 |
| KR | 10-2016-0016040 A | 2/2016 |

OTHER PUBLICATIONS

Extended European Search Report for European Application No. 17792824.9, dated May 30, 2018.
International Search Report (PCT/ISA/210) issued in PCT/KR2017/004381, dated Aug. 8, 2017.

* cited by examiner

METHOD FOR MANUFACTURING SECONDARY BATTERY AND METHOD FOR MANUFACTURING ELECTRODE ASSEMBLY

CROSS-REFERENCE TO RELATED APPLICATION

The present application claims the benefit of the priority of Korean Patent Application No. 10-2016-0054112, filed on May 2, 2016, which is hereby incorporated by reference in its entirety.

TECHNICAL FIELD

The present invention relates to a method for manufacturing a secondary battery and a method for manufacturing an electrode assembly, and more particularly, to a method for manufacturing a secondary battery, which improves impregnation of an electrolyte to be injected into an interface between an electrode and a separator to remove an unreacted area when charged and discharged and a method for manufacturing an electrode assembly.

BACKGROUND ART

In general, secondary batteries refer to chargeable and dischargeable, unlike primary batteries that are not chargeable. The secondary batteries are being widely used in the high-tech electronic fields such as mobile phones, notebook computers, and camcorders.

DISCLOSURE OF THE INVENTION

Technical Problem

A secondary battery comprises an electrode assembly, an electrolyte, and a case in which the electrode assembly and the electrolyte are accommodated. The electrode assembly is manufactured by alternately stacking a plurality of electrodes and a plurality of separators.

The secondary battery comprising the above-described constituents may be manufactured through processes of inserting the electrode assembly into the case, injecting the electrolyte into the case in which the electrode assembly is accommodated, and sealing an opening of the case.

Here, the electrolyte injected into the case may be impregnated into the electrode assembly to improve performance of the electrode assembly.

However, in the secondary battery, the electrolyte is not absorbed up to the inside of the electrode assembly by resistance due to bonding force of the interface between the electrode and the separator to limit improvement in performance of the electrode assembly.

The present invention has been made to solve the above-mentioned problem, and an object of the prevent invention is to provide a method for manufacturing a secondary battery, which comprises a process of forming a nonbonding portion on an interface between an electrode and a separator to improve impregnation of an electrolyte and thereby to performance of the electrode assembly.

Another object of the present invention is to provide a method for manufacturing a secondary battery, which further comprises a process of bonding a nonbonding portion formed on an interface between an electrode and a separator to remove an unreacted area when charged and discharged, thereby improving performance of the electrode assembly.

Technical Solution

To achieve the abovementioned object, a method for manufacturing a secondary battery according to an embodiment of the present invention comprises: a first process (S10) of manufacturing an incomplete electrode assembly in which a plurality of electrodes and a plurality of separators are alternately stacked; a second process (S20) of partially pressing the incomplete electrode assembly to pattern-bond an interface between the electrode and the separator and thereby to manufacture a complete electrode assembly in which a bonding portion and a nonbonding portion coexist on the interface between the electrode and the separator; a third process (S30) of accommodating the complete electrode assembly into a case; a fourth process (S40) of injecting an electrolyte through an opening of the case to impregnate the electrolyte into the electrode assembly, wherein the electrolyte is permeated into nonbonding portion of the interface between the electrode and the separator and impregnated up to the inside of the electrode assembly; a fifth process (S50) of sealing an unsealed surface in which the opening of the case is formed to manufacture a secondary battery; and a sixth process (S60) of heating and pressing an entire surface of the secondary battery to bond the nonbonding portion of the interface between the electrode and the separator.

In the incomplete electrode assembly, the plurality of electrodes may be provided with a first electrode and a second electrode, and the plurality of separators may be provided with a first separator and a second separator.

The incomplete electrode assembly may comprise a radical unit in which a first electrode, a first separator, a second electrode, and a second separator are sequentially stacked or has a structure in which at least two or more radical units are stacked.

The incomplete electrode assembly may be provided with a first radical unit and a second radical unit, which are vertically stacked with a separation sheet therebetween, the first radical unit may have a structure in which the first electrode, the first separator, the second electrode, the second separator, and the first electrode are sequentially stacked, and the second radical unit may have a structure in which the second electrode, the second separator, the first electrode, the first separator, and the second electrode are sequentially stacked.

The first electrode may be a negative electrode, and the second electrode is a positive electrode.

In the second process (S20), the incomplete electrode assembly may be partially heated and pressed through a pattern roller to manufacture the complete electrode assembly in which the interface between the electrode and the separator is pattern-bonded.

The pattern roller may comprise a roller part disposed on a top or bottom surface of the incomplete electrode assembly and having rotational force and a patterned pressing protrusion, which is disposed on an outer circumferential surface of the roller part to partially heat and press the top or bottom surface of the incomplete electrode assembly.

The roller part may be disposed in a width direction of the incomplete electrode assembly, the pressing protrusion may be formed in a circumferential direction of the roller part to form a bonding portion that is patterned in a linear shape on the interface between the electrode and the separator, which is pressed by the pressing protrusion, and a nonbonding portion may have a linear shape is formed on the interface between the electrode and the separator, which is not pressed by the pressing protrusion.

The sixth process may be performed by a heating and pressing device that heats and presses both surfaces of the secondary battery at the same time.

The heating and pressing device may comprise a pressing body on which the secondary battery is mounted and a pressing part comprising a heat generation plate that heats and presses the secondary battery mounted on the pressing body.

The heat generation plate may be provided as a metal plate comprising a built-in heating wire.

In the fifth process (S50), an unsealed surface in which an opening of the case is formed may be press-fitted, and simultaneously, heat may be applied to the unsealed surface to seal an entire sealing surface.

After the sixth process (S60), the method may further comprise a seventh process (S70) of charging and discharging the secondary battery to manufacture the complete secondary battery.

A method for manufacturing an electrode assembly according to the present invention comprises: a first process (S10) of manufacturing an incomplete electrode assembly in which a plurality of electrodes and a plurality of separators are alternately stacked; and a second process (S20) of partially pressing the incomplete electrode assembly to pattern-bond an interface between the electrode and the separator and thereby to manufacture a complete electrode assembly in which a bonding portion and a nonbonding portion coexist on the interface between the electrode and the separator.

In the second process (S20), the incomplete electrode assembly may be partially heated and pressed through a pattern roller to manufacture the complete electrode assembly in which the interface between the electrode and the separator is pattern-bonded.

The pattern roller may comprise a roller part disposed on a top or bottom surface of the incomplete electrode assembly and having rotational force and a patterned pressing protrusion, which is disposed on an outer circumferential surface of the roller part to partially heat and press the top or bottom surface of the incomplete electrode assembly.

The roller part may be disposed in a width direction of the incomplete electrode assembly, the pressing protrusion may be formed in a circumferential direction of the roller part to form a bonding portion that is patterned in a linear shape on the interface between the electrode and the separator, which is pressed by the pressing protrusion, and a nonbonding portion may have a linear shape is formed on the interface between the electrode and the separator, which is not pressed by the pressing protrusion.

Advantageous Effects

The present invention has effects as follows.

First: the electrode assembly provided with the plurality of electrodes and the plurality of separators may be partially pressed at the high temperature to pattern-bond the interface between the electrode and the separator, thereby improving the impregnation of the electrolyte because the electrolyte is permeated into the nonbonding portion of the interface between the electrode and the separator when the electrolyte is impregnated into the electrode assembly.

Second: in the present invention, the electrode assembly may be partially heated and pressed by using the pattern roller on which the pressing protrusion is patterned to stably pattern-bond the interface between the electrode and the separator, which are provided in the electrode assembly.

Third: in the present invention, the interface between the electrode and the separator may be patterned to be bonded in the longitudinal direction of the electrode assembly and thereby to the permeation of the electrolyte, thereby improving the impregnation of the electrolyte.

Fourth: in the present invention, the entire surface of the secondary battery comprising the pattern-bonded electrode assembly may be heated and pressed to bond the nonbonding portion of the interface between the electrode and the separator, which are provided in the electrode assembly, to improve the charging and discharging efficiency without the unreacted areas when the secondary battery is charged and discharged.

Fifth: in the present invention, the entire surface of the secondary battery comprising the pattern-bonded electrode assembly may be heated and pressed by using the heating and pressing device to stably bond the nonbonding portion of the interface between the electrode and the separator.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Method for Manufacturing Secondary Battery]

As illustrated in FIGS. 1 to 12, a method for manufacturing a secondary battery according to the present invention comprises a first process (S10) of manufacturing an incomplete electrode assembly 10' in which a plurality of electrodes and a plurality of separators are alternately stacked, a second process (S20) of partially heating and pressing the incomplete electrode assembly 10' to manufacture a complete electrode assembly 10 in which an interface between the electrode and the separator is pattern-bonded, a third process (S30) of accommodating the complete electrode assembly 10 into a case 20, a fourth process (S40) of injecting an electrolyte 30 through an opening 21 of the case to impregnate the electrolyte 30 into the electrode assembly 10, wherein the electrolyte 30 is permeated into nonbonding portion 10b of the interface between the electrode and the separator and impregnated up to the inside of the electrode assembly 10, a fifth process (S50) of sealing an unsealed surface in which the opening 21 of the case 20 is formed to manufacture a secondary battery 1, a sixth process (S60) of heating and pressing an entire surface of the secondary battery 1 to bond the nonbonding portion 10b of the interface between the electrode and the separator, and a seventh process (S70) of charging and discharging the secondary battery 1 to activate the secondary battery 1.

First Process (S10)

Figure 1:
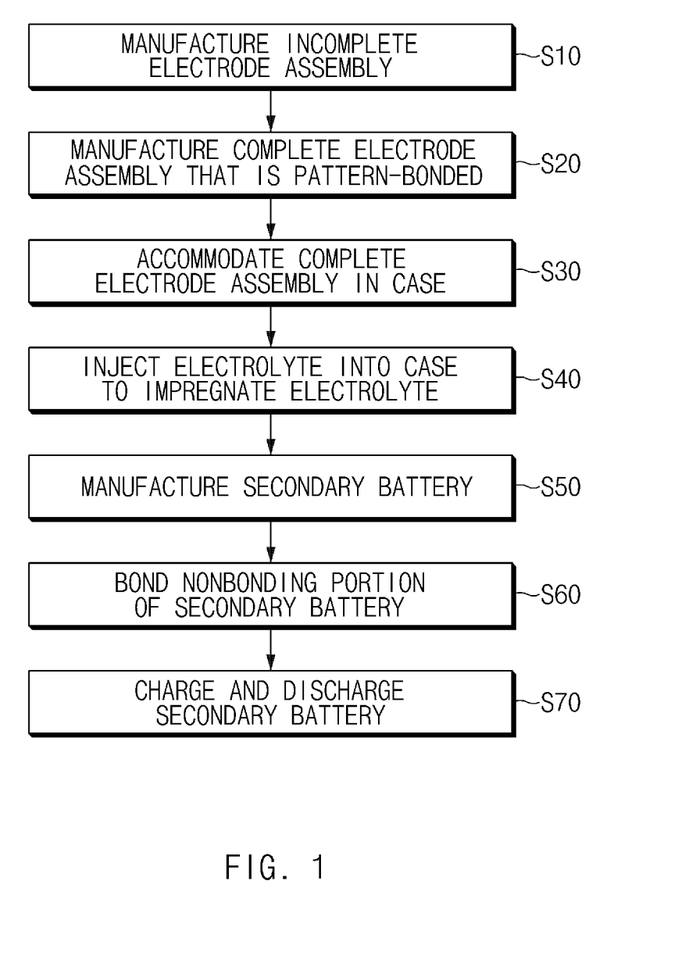
FIG. 1 is a flowchart illustrating a method for manufacturing a secondary battery according to an embodiment of the present invention.
Figure 2:
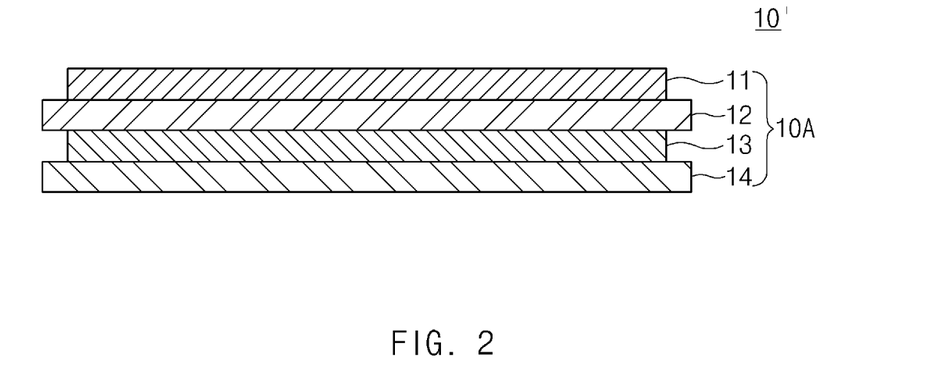
FIG. 2 is a view illustrating a first example of an incomplete electrode assembly in the method for manufacturing the secondary battery according to an embodiment of the present invention.
Figure 3:
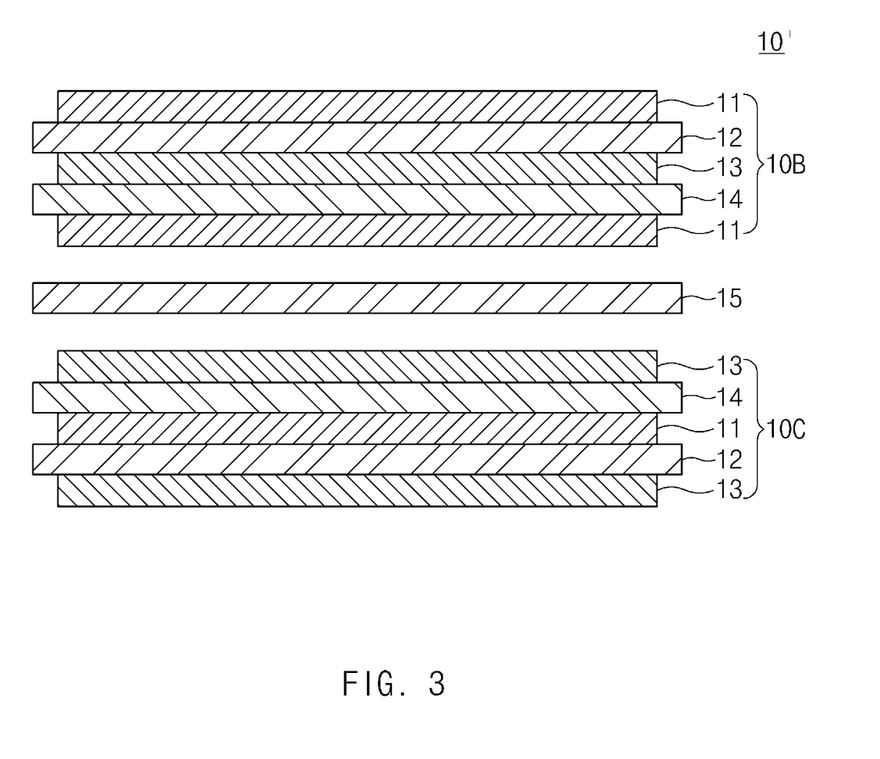
FIG. 3 is a view illustrating a second example of the incomplete electrode assembly in the method for manufacturing the secondary battery according to an embodiment of the present invention.

As illustrated in FIGS. 2 and 3, the first process (S10) is a process of manufacturing the incomplete electrode assembly 10'. That is, in the first process (S10), the plurality of electrodes and the plurality of separators are alternately stacked to manufacture the incomplete electrode assembly 10'.

Here, in the incomplete electrode assembly 10', the plurality of electrodes are provided with a first electrode 11 and a second electrode 13, and the plurality of separators are provided with a first separator 12 and a second separator 14.

According to a first embodiment, as illustrated in FIG. 2, the incomplete electrode assembly 10' comprises a radical unit 10A in which a first electrode 11, a first separator 12, a second electrode 13, and a second separator 14 are sequentially stacked or has a structure at least two or more radical units 10A are stacked.

According to a second embodiment, as illustrated in FIG. 3, the incomplete electrode assembly 10' is provided with a first radical unit 10B and a second radical unit 10C, which are vertically stacked with a separation sheet 15 therebetween. The first radical unit 10B has a structure in which the first electrode 11, the first separator 12, the second electrode 13, the second separator 14, and the first electrode 11 are sequentially staked, and the second radical unit 10C has a structure in which the second electrode 13, the second separator 14, the first electrode 11, the first separator 12, and the second electrode 13 are sequentially stacked.

Here, the first electrode may be a negative electrode, and the second electrode may be a positive electrode. Thus, the incomplete electrode assembly 10' in which the negative electrode and the positive electrode are stacked with the separator therebetween may be manufactured.

The present invention will be described with reference to the incomplete electrode assembly 10' manufactured according to the first embodiment.

Second Process (S20)

Figure 4:
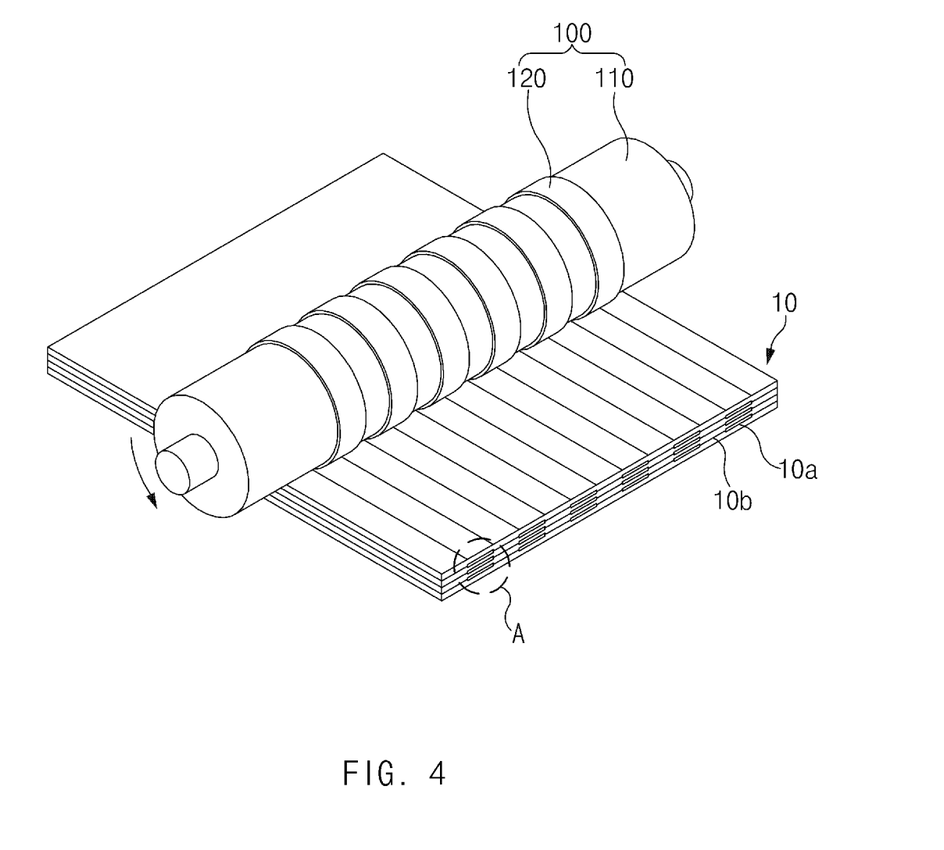
FIG. 4 is a view illustrating a second process of manufacturing a complete electrode assembly in the method for manufacturing the secondary battery according to an embodiment of the present invention.

As illustrated in FIG. 4, in the second process (S20), the complete electrode assembly 10 in which the interface between the electrode and the separator is pattern-bonded is manufactured. That is, in the second process (S20), the incomplete electrode assembly 10' is partially heated and pressed to manufacture the complete electrode assembly 10 in which the interface between the electrode and the separator is pattern-bonded. That is to say, the complete electrode assembly in which the bonding portion and the nonbonding portion coexist on the interface between the electrode and the separator may be manufactured.

For example, as illustrated in FIG. 4, in the second process (S20), the incomplete electrode assembly 10' is partially heated and pressed by using a pattern roller 100 to manufacture the complete electrode assembly 10 in which the interface between the electrode and the separator is pattern-bonded. However, all of the heating and the pressing have not to be performed, and thus, the second process (S20) may be performed only through the partial pressing.

Here, the pattern roller 100 is disposed in a top or bottom surface of the incomplete electrode assembly 10' in a width direction of the incomplete electrode assembly 10' and comprises a roller part 110 having rotational force and a patterned pressing protrusion 120 disposed on an outer circumferential surface of the roller part 110 to partially heat and press the top or bottom surface of the incomplete electrode assembly 10'.

That is, when the roller part 110 rotates, the pattern roller 100 partially heats and presses the top or bottom surface of the incomplete electrode assembly 10'. Here, the surface of the incomplete electrode assembly 10' pressed by the pressing protrusion 120 is bonded to form a bonding portion 10a, and a surface of the incomplete electrode assembly 10', which is not pressed by the pressing protrusion 120, forms a nonbonding portion 10b.

Particularly, the pressing protrusion 120 is formed to be connected in a circumferential direction of the roller part 110. Thus, the incomplete electrode assembly 10' is heated and pressed in a longitudinal direction to form the bonding portion 10a that is patterned in a linear shape on the interface between the electrode and the separator. Also, the nonbonding portion 10b having the linear shape is formed on the interface between the electrode and the separator, which is not pressed by the pressing protrusion 120.

Figure 5:
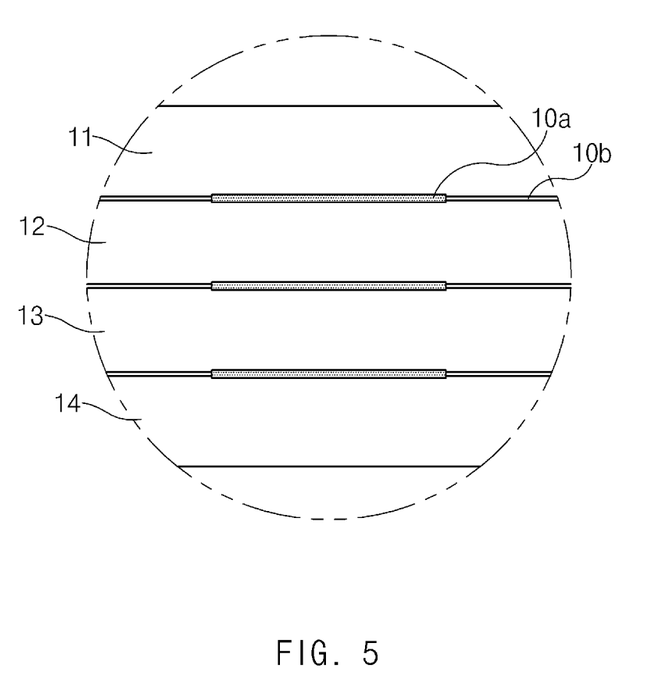
FIG. 5 is an enlarged view of a portion 'A' illustrated in FIG. 4.

Referring to FIG. 5, the patterned bonding portion 10a is formed on each of the interface between the first electrode 11 and the first separator 12, the interface between the first separator 12 and the second electrode, and the interface between the second electrode 13 and the second separator 14, and the nonbonding portion 10b is formed on the bonding portions 10a adjacent to each other.

Although the electrode assembly having a predetermined size is described as one embodiment in an embodiment of the present invention, an electrode assembly in which an electrode sheet and a separation sheet are stacked may be pattern-bonded through the pattern roller 100.

Third Process (S30)

Figure 6:
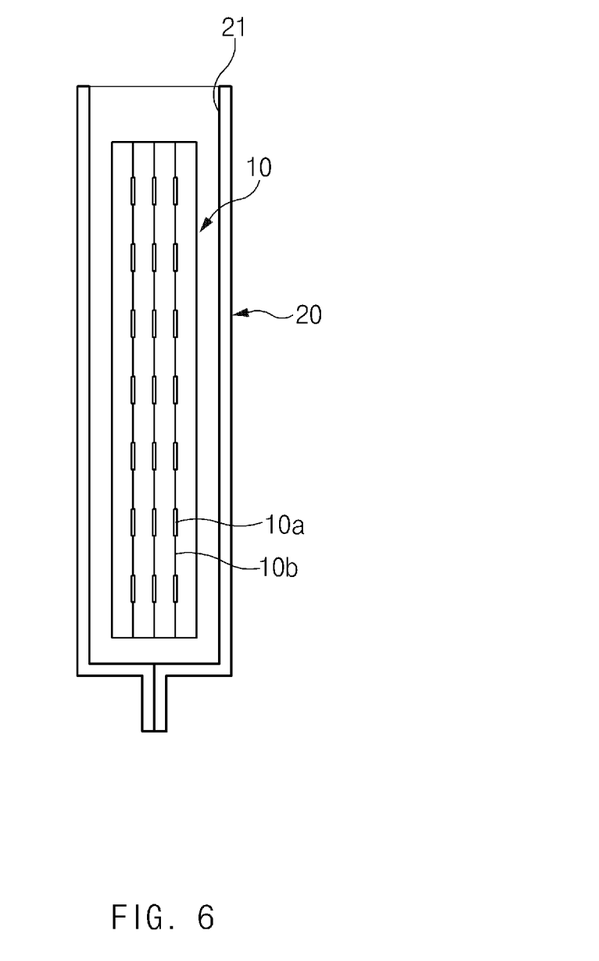
FIG. 6 is a view illustrating a third process of accommodating the complete electrode assembly into a case in the method for manufacturing the secondary battery according to an embodiment of the present invention.

As illustrated in FIG. 6, in the third process (S30), the complete electrode assembly 10 (hereinafter, referred to an electrode assembly 10) is accommodated into the case 20. That is, in a state in which an electrode tab provided in the electrode assembly 10 is led out to the outside of the electrode assembly 10, the electrode assembly 10 is inserted through an opening 21 of the case 20.

Fourth Process (S40)

Figure 7:
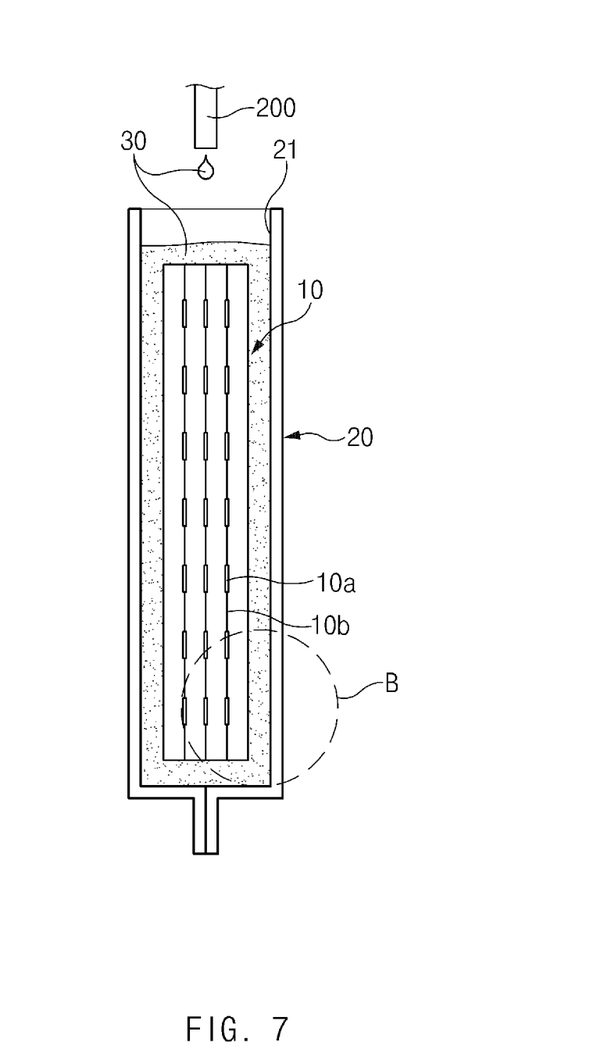
FIG. 7 is a view illustrating a fourth process of injecting an electrolyte into the case in the method for manufacturing the secondary battery according to an embodiment of the present invention.

As illustrated in FIG. 7, in the fourth process (S40), the electrolyte 30 is injected into the case 20. That is, the electrolyte 30 is injected into the case 20 in which the electrode assembly 10 is accommodated to impregnate the electrolyte 30 into the electrode assembly 10.

For example, as illustrated in FIG. 7, in the fourth process (S40), the case 20 is fixed so that the opening 21 faces an upper side, an electrolyte injection device 200 is disposed in the opening 21 of the case 20, and the electrolyte 30 is injected through the opening 21 of the case 20 by using the electrolyte injection device 200.

Figure 8:
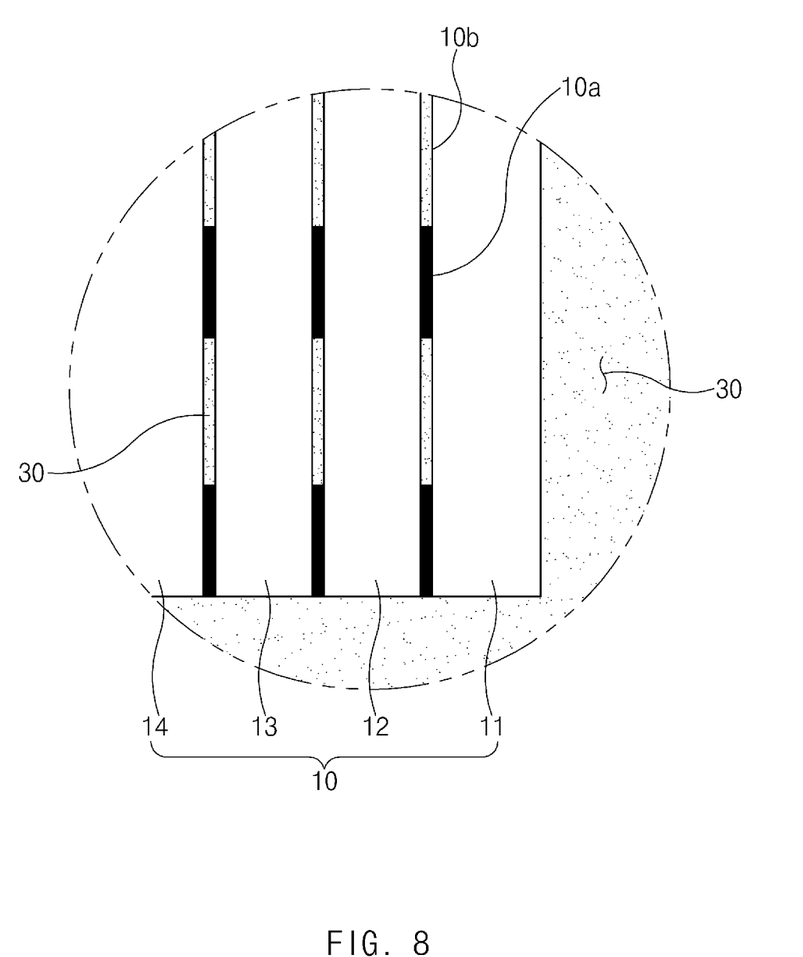
FIG. 8 is an enlarged view of a portion 'B' illustrated in FIG. 7.

Then, as illustrated in FIG. 8, the electrolyte 30 injected into the case 20 is absorbed and impregnated into the electrode assembly 10. Particularly, the electrolyte 30 is permeated into the nonbonding portion 10b of the interface between the electrode and the separator and then impregnated up to the inside of the electrode assembly 10.

Furthermore, the nonbonding portion 10b may be formed in the linear shape to improve the permeation of the electrolyte 30.

That is, the method for manufacturing the secondary battery according to the present invention may have a technical feature in which the nonbonding portion 10b is formed so that the electrolyte 30 is permeated into the interface between the electrode and the separator. Thus, the impregnation of the electrolyte 30 into the electrode assembly 10 may be significantly improved by the nonbonding portion 10b.

Fifth Process (S50)

Figure 9:
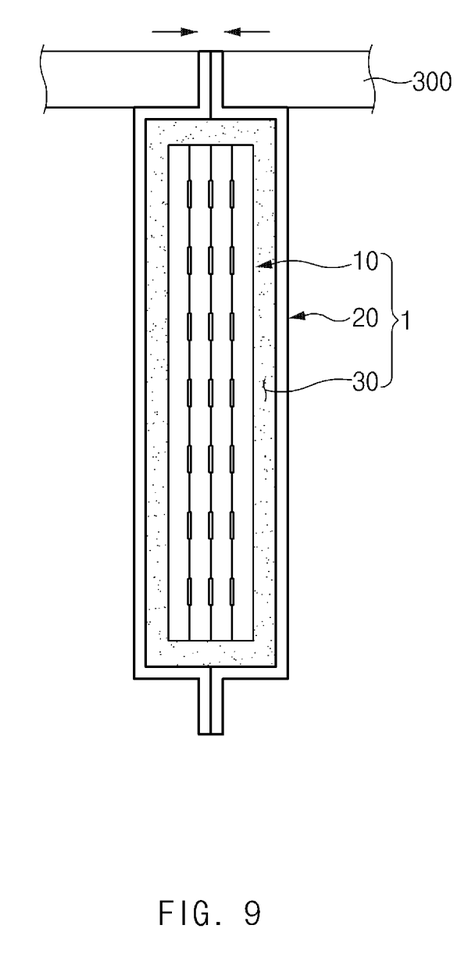
FIG. 9 is a view illustrating a fifth process of sealing an opening of the case to manufacture the secondary battery in the method for manufacturing the secondary battery according to an embodiment of the present invention.

As illustrated in FIG. 9, in the fifth process (S50), the case 20 is sealed to be airtight. That is, in the fifth process (S50), the unsealing surface in which the opening 21 of the case 20 is formed is sealed to manufacture the secondary battery 1.

For example, as illustrated in FIG. 9, in the fifth process (S50), the unsealed surface of the case 20 in which the electrode assembly 10 and the electrolyte 30 are accommodated may be sealed to be airtight by applying heat and a pressure through a thermal fusion device 300, thereby manufacturing the secondary battery 1.

Sixth Process (S60)

Figure 10:
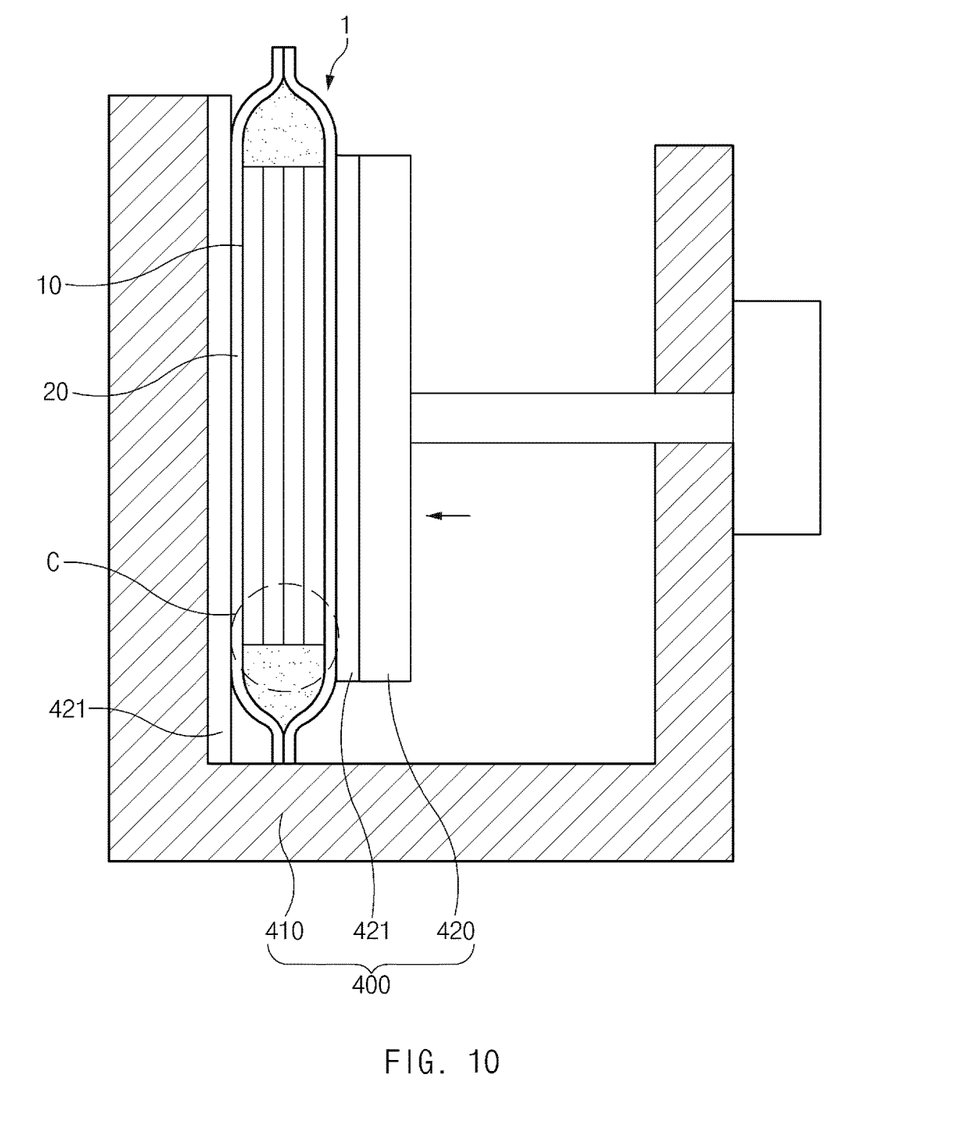
FIG. 10 is a view illustrating a sixth process of pressing the secondary battery at a high temperature in the method for manufacturing the secondary battery according to an embodiment of the present invention.

As illustrated in FIG. 10, in the sixth process (S60), the nonbonding portion 10b of the interface between the electrode and the separator is bonded. That is, the entire surface of the secondary battery 1 is heated and pressed to bond the nonbonding portion 10b of the interface between the electrode and the separator.

For example, as illustrated in FIG. 10, the sixth process (S60) is performed through a heating and pressing device 400 that heats and presses both surfaces of the secondary battery 1 at the same time.

Here, the heating and pressing device 400 comprises a pressing body 410 on which the secondary battery 1 is mounted and a pressing part 421 comprising a heat generation plate 420 that heats and presses a surface of the secondary battery 1 on which the pressing body 410 is mounted. Alternatively, the heat generation plate 421 is provided between a wall of the pressing body 410 and the surface of the secondary battery 1.

Figure 11:
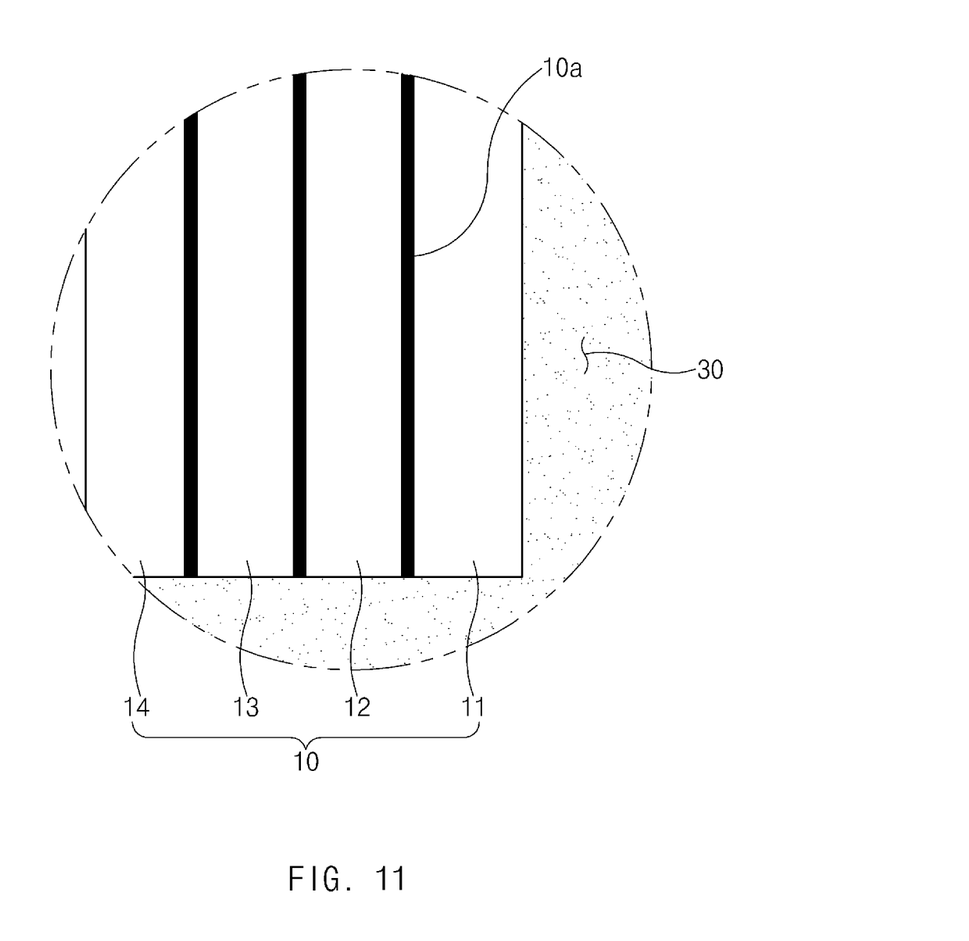
FIG. 11 is an enlarged view of a portion 'C' illustrated in FIG. 10.

That is, as illustrated in FIG. 11, the heating and pressing device 400 presses an entire surface of the secondary battery 1, on which the pressing body 410 is mounted, through the pressing part 420 to closely attach the electrode to the separator so that the nonbonding portion 10b is not formed in the interface between the electrode and the separator. In this state, the nonbonding portion 10b of the interface between the electrode and the separator is bonded by using high-temperature heat generated in the heat generation plate 421. Thus, the entire interface between the electrode and the separator may be bonded.

Seventh Process (S70)

Figure 12:
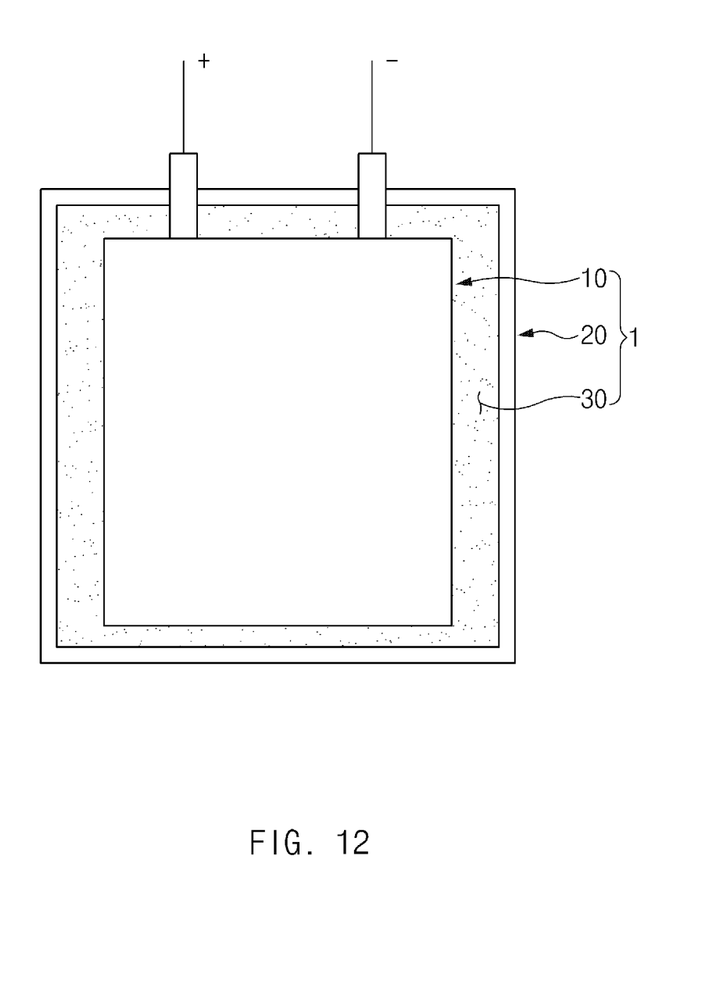
FIG. 12 is a view illustrating a seventh process of charging and discharging the secondary battery in the method for manufacturing the secondary battery according to an embodiment of the present invention.

As illustrated in FIG. 12, in the seventh process (S70), the secondary battery 1 is charged and discharged and then activated. That is, power is supplied to a positive electrode tab and a negative electrode tab of the secondary battery 1 to continuously perform the charging and discharging, thereby activating the secondary battery 1.

Here, the entire interface between the electrode and the separator may be bonded without forming an unreacted area to improve performance of the secondary battery.

That is, in the method for manufacturing the secondary battery according to the present invention, the nonbonding portion formed in the interface between the electrode and the separator may be bonded to improve the impregnation of the electrolyte and thereby to remove the unreacted area when charged and discharged, thereby improving the performance of the secondary battery.

The method for manufacturing the secondary battery comprising the above-described constituents may achieve the improvement in impregnation of the electrolyte and the improvement in performance of the secondary battery.

Hereinafter, in description of a secondary battery according to another embodiment of the present invention, constituents having the same configuration and function have been given with the same reference numeral in the drawings, and thus their duplicated descriptions will be omitted.

[Method for Manufacturing Electrode Assembly]

In the present invention, only the method for manufacturing the electrode assembly may be separately performed.

A method for manufacturing an electrode assembly in this embodiment comprises a first process (S10) of manufacturing an incomplete electrode assembly 19' in which a plurality of electrodes and a plurality of separators are alternately stacked and a second process (S20) of partially heating and pressing the incomplete electrode assembly 10' to manufacture a complete electrode assembly 10 in which an interface between the electrode and the separator is pattern-bonded.

Here, in the second process (S20), the incomplete electrode assembly 10' is partially heated and pressed through a pattern roller 100 to manufacture the complete electrode assembly 10 in which the interface between the electrode and the separator is pattern-bonded.

The first process (S10) and the second process (S20) are the same as the first process (S10) and the second process (S20), which are described in the abovementioned method for manufacturing the secondary battery, and thus, their detailed descriptions will be omitted.

As described above, in the method for manufacturing the electrode assembly according to this embodiment, the electrode assembly 10 having the patterned bonding portion on the interface between the electrode and the separator may be manufactured.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising:

a first process (S10) of manufacturing an incomplete electrode assembly in which a plurality of electrodes and a plurality of separators are alternately stacked;

a second process (S20) of partially pressing the incomplete electrode assembly to pattern-bond an interface between the electrode and the separator and thereby to manufacture a complete electrode assembly in which a bonding portion and a nonbonding portion coexist on the interface between the electrode and the separator;

a third process (S30) of accommodating the complete electrode assembly into a case;

a fourth process (S40) of injecting an electrolyte through an opening of the case to impregnate the electrolyte into the electrode assembly, wherein the electrolyte is permeated into nonbonding portion of the interface between the electrode and the separator and impregnated up to the inside of the electrode assembly;

a fifth process (S50) of sealing an unsealed surface in which the opening of the case is formed to manufacture a secondary battery; and a sixth process (S60) of heating and pressing an entire surface of the secondary battery to bond the nonbonding portion of the interface between the electrode and the separator.

2. The method of claim 1, wherein, in the incomplete electrode assembly, the plurality of electrodes are provided with a first electrode and a second electrode, and the plurality of separators are provided with a first separator and a second separator.

3. The method of claim 2, wherein the incomplete electrode assembly comprises a radical unit in which a first electrode, a first separator, a second electrode, and a second separator are sequentially stacked or has a structure in which at least two or more radical units are stacked.

4. The method of claim 2, wherein the incomplete electrode assembly is provided with a first radical unit and a second radical unit, which are vertically stacked with a separation sheet therebetween, the first radical unit has a structure in which the first electrode, the first separator, the second electrode, the second separator, and the first electrode are sequentially stacked, and the second radical unit has a structure in which the second electrode, the second separator, the first electrode, the first separator, and the second electrode are sequentially stacked.

5. The method of claim 2, wherein the first electrode is a negative electrode, and the second electrode is a positive electrode.

6. The method of claim 2, wherein, in the second process (S20), the incomplete electrode assembly is partially heated and pressed through a pattern roller to manufacture the complete electrode assembly in which the interface between the electrode and the separator is pattern-bonded.

7. The method of claim 6, wherein the pattern roller comprises a roller part disposed on a top or bottom surface of the incomplete electrode assembly and having rotational force and a patterned pressing protrusion disposed on an outer circumferential surface of the roller part to partially heat and press the top or bottom surface of the incomplete electrode assembly.

8. The method of claim 7, wherein the roller part is disposed in a width direction of the incomplete electrode assembly, the pressing protrusion is formed in a circumferential direction of the roller part to form a bonding portion that is patterned in a linear shape on the interface between the electrode and the separator, which is pressed by the pressing protrusion, and a nonbonding portion has a linear shape is formed on the interface between the electrode and the separator, which is not pressed by the pressing protrusion.

9. The method of claim 1, wherein the sixth process is performed by a heating and pressing device that heats and presses both surfaces of the secondary battery at the same time.

10. The method of claim 9, wherein the heating and pressing device comprises a pressing body on which the secondary battery is mounted and a pressing part comprising a heat generation plate that heats and presses the secondary battery mounted on the pressing body.

11. The method of claim 10, wherein the heat generation plate is provided as a metal plate comprising a built-in heating wire.

12. The method of claim 1, wherein, in the fifth process (S50), an unsealed surface in which an opening of the case is formed is press-fitted, and simultaneously, heat is applied to the unsealed surface to seal an entire sealing surface.

13. The method of claim 1, after the sixth process (S60), further comprising a seventh process (S70) of charging and discharging the secondary battery to manufacture the complete secondary battery.

* * * * *